Sept. 1, 1925.

J. W. LEE

HANDWHEEL

Original Filed Dec. 8, 1922   3 Sheets-Sheet 1

Witness.

Inventor.
John W. Lee
By Ralph H. Chilton
his Attorney.

Sept. 1, 1925.

J. W. LEE

HANDWHEEL

Original Filed Dec. 8, 1922  3 Sheets-Sheet 2

Witness.
Chas. E. Bird
Wm. T. Pasco.

Inventor.
John W. Lee
By Ralph W. Chilton
his Attorney.

Sept. 1, 1925. 1,552,175
J. W. LEE
HANDWHEEL
Original Filed Dec. 8 1922   3 Sheets-Sheet 3
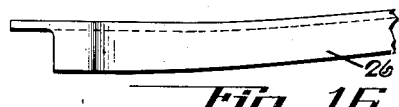
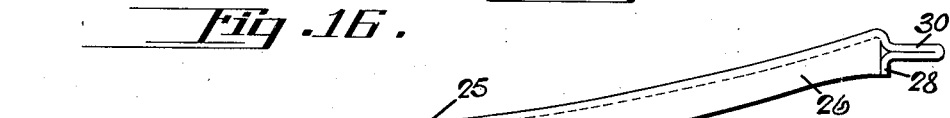
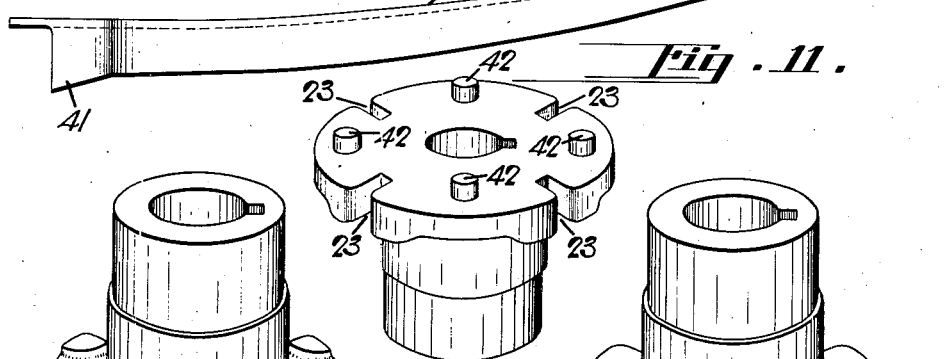
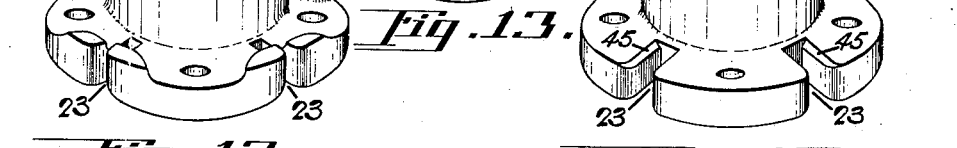
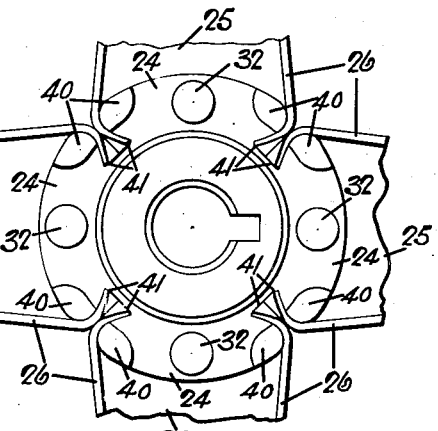
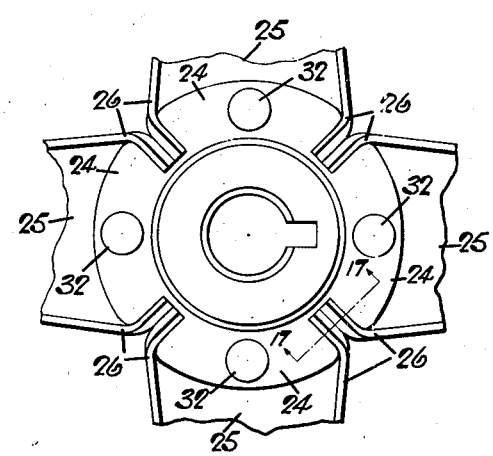
Witnesses.
Inventor.
John W. Lee
By
Ralph H. Chilton
his Attorney.

Patented Sept. 1, 1925.

1,552,175

UNITED STATES PATENT OFFICE.

JOHN WESLEY LEE, OF DAYTON, OHIO, ASSIGNOR, BY MESNE ASSIGNMENTS, TO THE INLAND MANUFACTURING COMPANY, OF DAYTON, OHIO, A CORPORATION OF DELAWARE.

HANDWHEEL.

Application filed December 8, 1922, Serial No. 605,555. Renewed March 2, 1925.

*To all whom it may concern:*

Be it known that I, JOHN W. LEE, a citizen of the United States of America, residing at Dayton, county of Montgomery, and State of Ohio, have invented certain new and useful Improvements in Handwheels, of which the following is a full, clear, and exact description.

This invention relates to handwheels and particularly to the type of wheel ordinarily employed as a steering wheel for automobiles, airplanes or motor boats.

The present invention is particularly concerned with a simple, well appearing, and strong construction for joining the hub of the wheel with the inner ends of pressed metal spider spokes.

Another feature of this invention is the simple method of forming a shoulder near the outer ends of the spokes by folding the end of the spoke back upon itself and supporting the flanged tip by the side flanges of the spoke.

Further objects and advantages of the present invention will be apparent from the following description, reference being had to the accompanying drawings, wherein preferred forms of embodiment of the present invention are clearly shown.

In the drawings:

Fig. 10 is a bottom view of a modified form of attachment of the arms to the hub.

Fig. 11 is an elevation of a spider arm adapted for use with the hub of Fig. 10.

Fig. 12 is a perspective view of the under side of the hub of Fig. 10.

Fig. 13 is a perspective view of the top side of the hub of Fig. 10, but showing the modification of malleable lugs integral with the hub instead of separate rivets as shown in Fig. 10.

Fig. 14 is a bottom view of another modified form of hub.

Fig. 15 is a perspective view of the under side of the hub of Fig. 14.

Fig. 16 is a side elevation of the inner end of the spider arm adapted for use with the hub of either Fig. 3 or Fig. 14.

Fig. 17 is a section on line 17—17 of Fig. 14 and shows the arm flanges clinched over on the under side of the hub flange.

In the drawings like or similar reference characters refer to like or similar parts throughout the several views.

Figure 2:
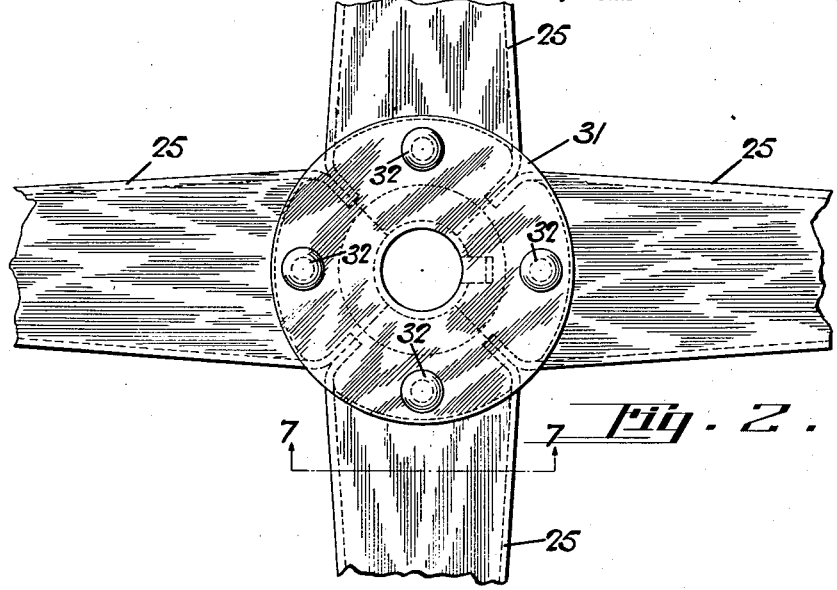
Fig. 2 is a top view of the central portion of the spider, showing the hub in dotted lines.
Figure 1:
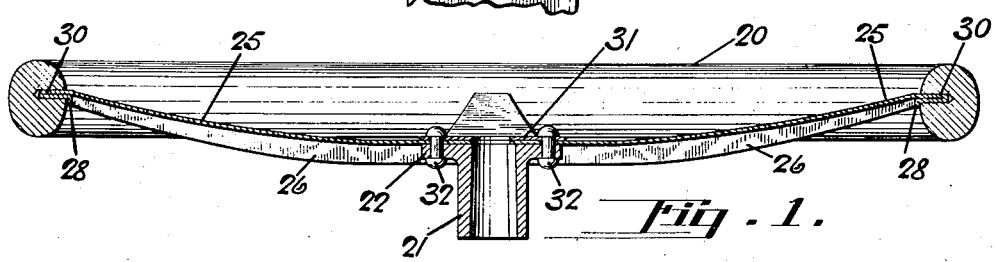
Fig. 1 is a vertical section through a steering wheel built according to this invention.
Figure 3:
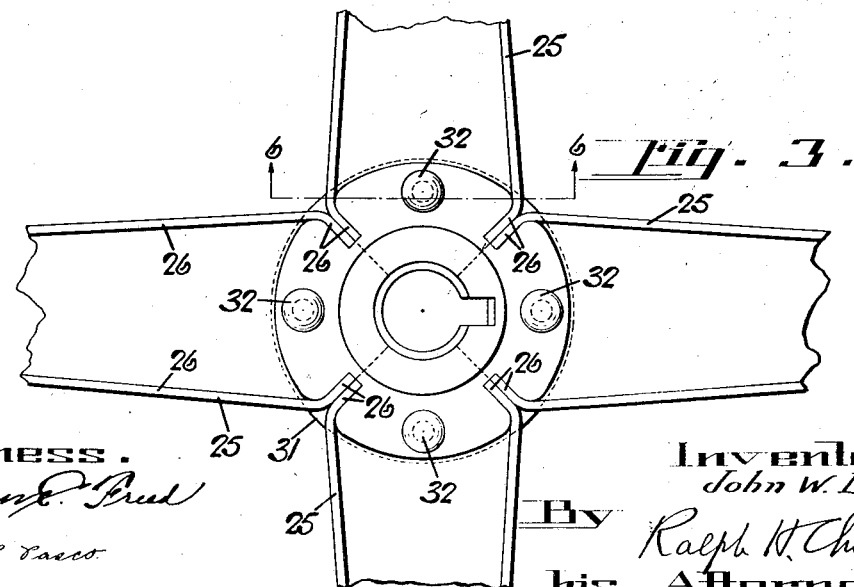
Fig. 3 is a bottom view of the central portion.
Figure 5:
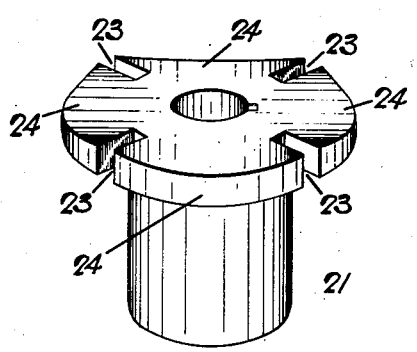
Fig. 5 is a perspective view of the hub, showing the segments of the hub flange deformed so that they are concave upwardly.
Figure 8:
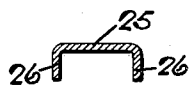
Fig. 8 is a section on line 8—8 of Fig. 9.

In Fig. 1 numeral 20 designates the rim which may be formed of wood or any other suitable material. The hub 21 has an annular flange 22 which has four radial slots 23 cut therein (see Fig. 5). The four sectors 24 of the annular flange are given a curved form as shown in Figs. 5 and 6, which deformation of the metal of the flange will cause the slots 23 to open up slightly wider so that the spoke flanges will fit snugly therein.

Figure 4:
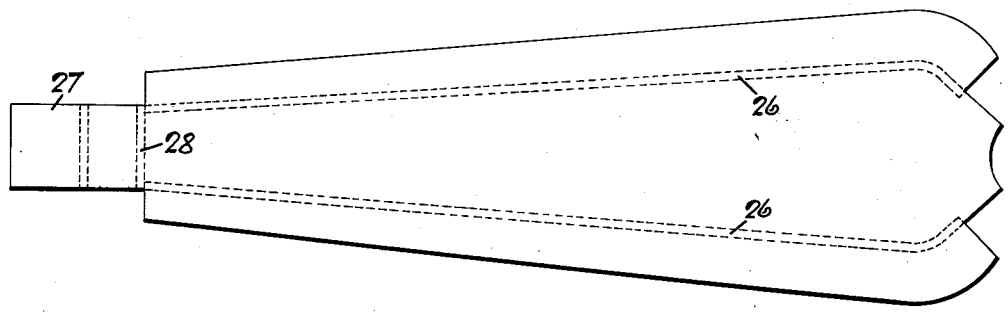
Fig. 4 is a development of one of the spider arms and shows in dotted lines the form of the arm at the time it is assembled upon the hub.
Figure 9:
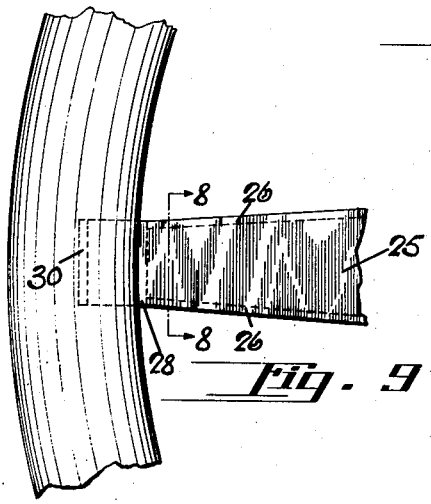
Fig. 9 is a detail view illustrating the manner of securing the outer ends of the arms to the rim.

The spider arms 25 are made up from a blank of sheet metal of the form shown in Fig. 4. The arm side flanges 26 are first bent down as shown in dotted lines in Fig. 4, after which the end portion 27 is folded back upon itself and the tip 28 bent down in such position that it is backed up by the ends of the side flanges 26 (see Figs. 1, 9 and 11). By this means the spider arm is provided with an outer extremity 30 of suitable thickness for insertion in the recesses in the inner periphery of the rim and with a strong shoulder 28 for taking the radial pressure of the arm upon the rim. The ends may be formed either as clearly shown in Fig. 11 or as in Fig. 1.

Figure 6:
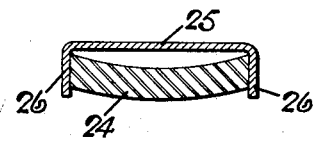
Fig. 6 is a section on line 6—6 of Fig. 3 and shows a section through the deformed hub flange before it is flattened out.
Figure 7:
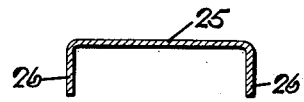
Fig. 7 is a section on line 7—7 of Fig. 2.

The arms 25 are placed over the curved sectors 24 of the hub flange so that the flanges 26 fit snugly into the slots 23 (see Fig. 6). The curved sectors 24 are then flattened out by any suitable means, thus reducing the width of the slots 23 and tightly clamping the flanges 26 therein, thus securely fastening the arms to the hub. In order to make a better appearing spider and to further secure the arms 25 to the hub 21, a cover plate 31 is preferably used to cover the inner ends of the spider arms. This cover plate 31 may be riveted to the hub flange 22 by rivets 32 as shown in Figs. 1, 3, 10 and 14.

The modification shown in Fig. 10 will now be described. In this modification the hub flange sectors 24 are not deformed as in the previous modification but at the edge of each of the slots 23 on the underside are provided lugs 40. Preferably the arm flanges 26 are slightly widened at their inmost end as shown at 41 in Fig. 11. Now after the arms 25 have been assembled upon the hub, the tips 41 of the flanges 26 are clinched over around the projections 40 as clearly shown in Fig. 10. The cover plate 31 and rivets 32 may also be used with this modification. However, instead of using separate rivets 32, the malleable lugs 42 made integral with the hub (see Fig. 13) may be used for riveting the cover plate 31 to the hub.

In the modification of Fig. 14, the hub flange sectors 24 are not deformed but the arm flanges 26 project slightly below the hub flange and are clinched over on the bottom as clearly shown in Fig. 14. Preferably the bottom corners of the slots 23 are rounded or beveled off as shown at 45 in Figs. 15 and 17, to permit of a neater and stronger job of clinching the flanges 26. Of course the cover plate 31 may also be used with this modification and with either separate rivets or with lugs as shown at 42 in Fig. 13.

While the forms of mechanism herein shown and described, constitute preferred forms of embodiment of the present invention, it is to be understood that other forms might be adopted, all coming within the scope of the claims which follow.

What I claim is as follows:

1. A steering wheel including a rim, a central hub having a flange with radial recesses therein, spider arms formed of pressed metal and having downwardly turned flanges at their inner ends inserted within the radial recesses in said hub flange, and means for rigidly securing said arms to said hub flange.

2. A steering wheel including a rim, a central hub having a flange with radial recesses therein, spider arms formed of pressed metal and having downwardly turned flanges at their inner ends inserted within the radial recesses in said hub flange, the arm flanges being clinched over the under side of the hub flange.

3. A steering wheel including a rim, a central hub having a flange with radial recesses therein, spider arms formed of pressed metal and having downwardly turned flanges at their inner ends inserted within the radial recesses in said hub flange, the arm flanges being clinched over the under side of the hub flange, and additional means for rigidly securing the arms to the hub.

4. In a steering wheel in combination, a spider including a central hub having a flange with a plurality of radial recesses therein, and a plurality of spider arms each having at its inner end a plurality of downwardly extending projections inserted within said radial recesses.

5. In a steering wheel in combination, a spider including a central hub having a flange with a plurality of radial recesses therein, and a plurality of spider arms each having at its inner end a plurality of downwardly extending projections inserted within said radial recesses, said projections being bent over on the under side of said hub flange to rigidly secure the arms to the hub.

6. In a steering wheel in combination, a spider including a central hub having a flange with a plurality of radial recesses therein, and a plurality of spider arms each having at its inner end a plurality of downwardly extending projections inserted within said radial recesses, and a cover for the inner ends of said arms rigidly secured to said hub.

7. The method of attaching pressed metal spokes to a wheel hub including forming radial slots in said hub, turning down flanges on the lateral edges of the inner ends of the spokes, inserting said spoke flanges within the radial slots, and then clinching the projecting part of the flanges on the under side of the hub to hold said spokes rigidly in place.

8. In a steering wheel having pressed metal spider arms and a rim, in combination, means for securing the outer ends of the arms to the rim including recesses cut in the inner periphery of said rim to receive the outer ends of the arms, and shoulders near the outer ends of said arms abutting the inner periphery of the rim, said shoulders being formed by folding back the end of the arm and turning up the tip at an angle thereto.

9. In a wheel spider having flanged pressed metal spokes, a shoulder near the outer end of said spokes formed by cutting away the flanges at the outer portion of the spoke and bending back the end portion of the spoke upon itself so that the tip abuts against and is supported by the flange ends.

10. A steering wheel including a rim, a central hub having recesses in its upper surface, spider arms formed of pressed metal and having laterally spaced downwardly turned projections at their inner ends inserted within the recesses in said hub, and means for rigidly securing said arms to said hub.

11. A steering wheel including a rim, a central hub having recesses in its upper surface, spider arms formed of pressed metal, each arm having a plurality of laterally spaced downwardly turned projections at their inner ends inserted within the recesses in said hub, and means for rigidly securing said arms to said hub.

12. In a handwheel, in combination, a spider including a central hub having recesses in its upper surface, and a plurality of spider arms each having at its hub portion a plurality of downwardly extending laterally spaced projections inserted within said recesses.

13. In a handwheel, in combination, a spider including a central hub having recesses in its upper surface, and a plurality of spider arms each having at its hub portion two downwardly turned laterally spaced flanges inserted within said recesses.

In testimony whereof I hereto affix my signature.

JOHN WESLEY LEE.